United States Patent
Schmid

(10) Patent No.: US 8,890,964 B2
(45) Date of Patent: Nov. 18, 2014

(54) IMAGE CAPTURING SYSTEM FOR CAPTURING AND TRANSMITTING DIGITAL VIDEO IMAGES, IMAGE DATA PROCESSING SYSTEM FOR RECEIVING AND PROCESSING DIGITAL IMAGE DATA, IMAGE STABILIZING SYSTEM, AND METHOD FOR GENERATING DIGITAL VIDEO IMAGES WITH LITTLE BLURRING

(75) Inventor: Reiner Schmid, München (DE)

(73) Assignee: Siemens Aktiengesellschaft, Munich (DE)

( * ) Notice: Subject to any disclaimer, the term of this patent is extended or adjusted under 35 U.S.C. 154(b) by 337 days.

(21) Appl. No.: 13/516,789

(22) PCT Filed: Nov. 8, 2010

(86) PCT No.: PCT/EP2010/066972
§ 371 (c)(1),
(2), (4) Date: Jun. 18, 2012

(87) PCT Pub. No.: WO2011/082864
PCT Pub. Date: Jul. 14, 2011

(65) Prior Publication Data
US 2012/0262587 A1 Oct. 18, 2012

(30) Foreign Application Priority Data

Dec. 17, 2009 (DE) .......................... 10 2009 058 597

(51) Int. Cl.
*H04N 5/228* (2006.01)
*H04N 5/232* (2006.01)
(52) U.S. Cl.
CPC ................................. *H04N 5/23248* (2013.01)
USPC .................................. 348/208.6; 348/208.99
(58) Field of Classification Search
CPC .......... H04N 5/23248; H04N 5/23258; H04N 5/23267; H04N 5/23287

USPC ........ 348/208.99, 208.2, 208.3, 208.4, 208.5, 348/208.6, 208.7
See application file for complete search history.

(56) References Cited

U.S. PATENT DOCUMENTS 4,623,930 A * 11/1986 Oshima et al. ............. 348/208.5
4,959,725 A * 9/1990 Mandle ..................... 348/208.6
(Continued)

FOREIGN PATENT DOCUMENTS

CN 101171833 A 4/2008 ............. H04N 5/232
DE 19814951 A1 11/1999 ............. H04N 5/232
(Continued)

OTHER PUBLICATIONS

International PCT Search Report and Written Opinion, PCT/EP2010/066972, 13 pages, May 4, 2011.
(Continued)

*Primary Examiner* — Nicholas Giles
(74) *Attorney, Agent, or Firm* — King & Spalding L.L.P.

(57) ABSTRACT

An image capturing system for capturing and transmitting digital video images comprises an image sensor for acquiring digital image data at a particular time, a position control configured to control a position of at least one of the image sensor and the image capturing system based on a mechatronic model, at least one motion sensor configured to acquire position changes of the at least one of the image sensor and the image capturing system, and an output interface via which the acquired image data and associated metadata can be transmitted to an image data processing system, the metadata comprising the following data: up-to-date control data for position control at the particular time of the image data acquisition, an up-to-date parameter set of the mechatronic model at the particular time of the image data acquisition, and accumulated output data of the at least one motion sensor between the particular time of the image data acquisition and a time of a previous image data acquisition.

11 Claims, 1 Drawing Sheet

(56) References Cited

U.S. PATENT DOCUMENTS

| | | | |
|---|---|---|---|
| 6,734,902 B1 * | 5/2004 | Kawahara | 348/208.8 |
| 6,930,708 B1 * | 8/2005 | Sato et al. | 348/208.99 |
| 7,133,067 B1 | 11/2006 | Claus et al. | 348/208.3 |
| 7,218,675 B1 * | 5/2007 | Takahashi | 375/240.16 |
| 7,538,813 B2 | 5/2009 | Wernersson | 348/345 |
| 8,085,308 B2 | 12/2011 | Icho et al. | 348/208.99 |
| 2004/0212699 A1 * | 10/2004 | Molgaard | 348/231.99 |
| 2005/0001906 A1 * | 1/2005 | Sato et al. | 348/208.6 |
| 2005/0212931 A1 * | 9/2005 | Gallagher et al. | 348/239 |
| 2006/0017813 A1 * | 1/2006 | Okubo et al. | 348/208.2 |
| 2007/0104479 A1 | 5/2007 | Machida | 396/429 |
| 2008/0174663 A1 | 7/2008 | Iwabuchi | 348/208.6 |
| 2009/0066799 A1 | 3/2009 | Whitcombe | 348/208.5 |
| 2009/0135264 A1 | 5/2009 | John | 348/220.1 |
| 2012/0262587 A1 | 10/2012 | Schmid | 348/208.4 |

FOREIGN PATENT DOCUMENTS

| | | | | |
|---|---|---|---|---|
| DE | 102005029230 A1 | 1/2007 | | G02B 27/01 |
| DE | 102008001676 A1 | 11/2009 | | H04N 5/232 |
| GB | 2425907 A | 11/2006 | | H04N 5/232 |
| WO | 90/09077 A1 | 8/1990 | | H04N 5/91 |
| WO | 2007/097431 A1 | 8/2007 | | G06T 3/00 |
| WO | 2011/082864 A1 | 7/2011 | | H04N 5/232 |

OTHER PUBLICATIONS

German Office Action, German Patent Application No. 10 2009 058 597.4-31, 3 pages, Sep. 7, 2010.

Chinese Office Action, Application No. 201080057342.7, 10 pages, Apr. 22, 2014.

* cited by examiner

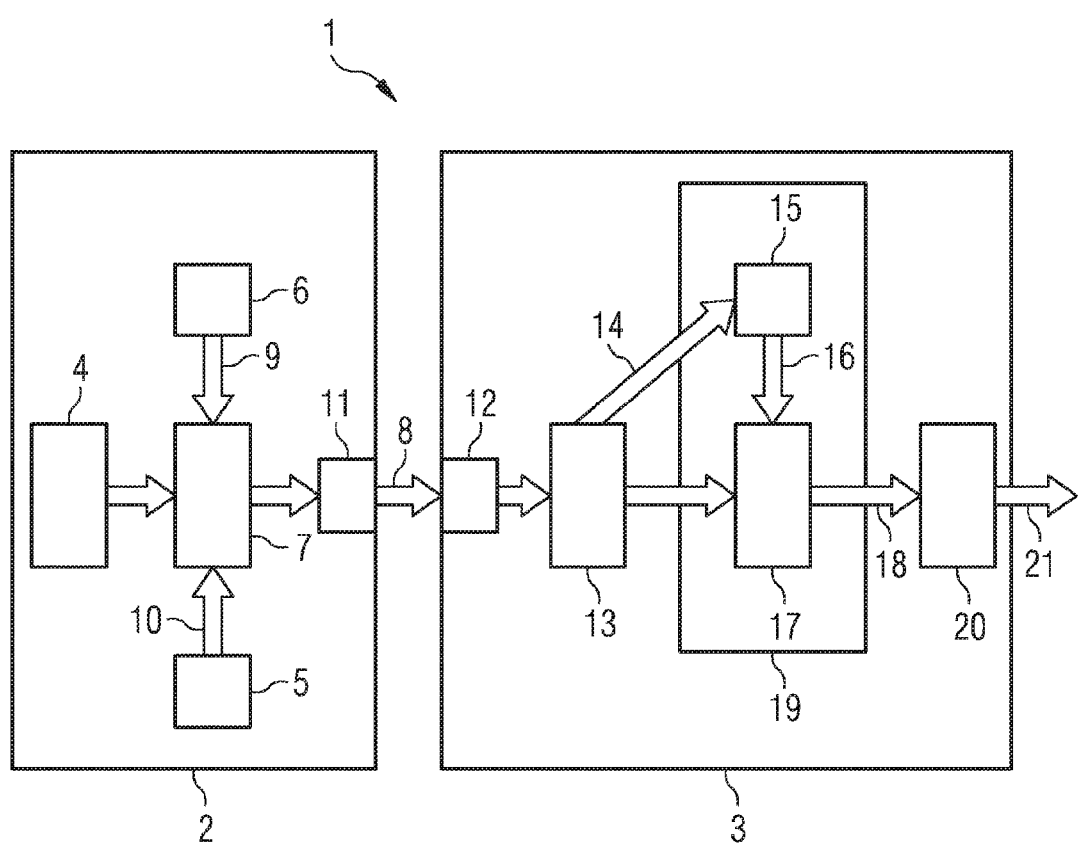

IMAGE CAPTURING SYSTEM FOR CAPTURING AND TRANSMITTING DIGITAL VIDEO IMAGES, IMAGE DATA PROCESSING SYSTEM FOR RECEIVING AND PROCESSING DIGITAL IMAGE DATA, IMAGE STABILIZING SYSTEM, AND METHOD FOR GENERATING DIGITAL VIDEO IMAGES WITH LITTLE BLURRING

CROSS-REFERENCE TO RELATED APPLICATIONS

This application is a U.S. National Stage Application of International Application No. PCT/EP2010/066972 filed Nov. 8, 2010, which designates the United States of America, and claims priority to DE Patent Application No. 10 2009 058 597.4 filed Dec. 17, 2009. The contents of which are hereby incorporated by reference in their entirety.

TECHNICAL FIELD

The disclosure relates to an image capturing system for capturing and transmitting digital video images, an image data processing system for receiving and processing digital image data, an image stabilizing system and a method for generating digital video images with little blurring.

BACKGROUND

Image stabilizing systems for preventing and/or correcting blurring when video images are captured and replayed are known, a distinction being made in this case between optical, mechanical and electronic image stabilizing systems. In the case of optical image stabilizing systems optical elements, for example prisms or lenses, or else the image sensor of the video camera, are moved in order to equalize movements which would result in blurring. Mechanical image stabilizing systems mostly use costly mechanical arrangements, for example in the form of a steadicam, in order to stabilize the position of the video camera. Electronic image stabilizing systems are frequently based on an automatic increase in sensitivity of the image sensor. Shorter exposure times are consequently possible, leading to less blurring of the video images. However, the increased sensitivity results in a deterioration in image quality because of increased image noise and/or the necessary denoising.

In addition, electronic image stabilizing systems are known in which accelerations and/or speeds of the video camera, which result in blurring, are acquired using motion sensors and are corrected by a data processing unit, e.g. a microcontroller. While these methods avoid the use of costly mechanical solutions, a deterioration in image quality as a result of curtailed exposure times or compute-intensive image analysis and correction procedures, they reach their limits if the video camera or the image sensor not only make undesired movements resulting in blurring, but also desired movements, i.e. those deliberately caused. This is the case for example for remote-controlled video cameras on board vehicles or aircraft for object monitoring.

DE 10 2005 029 230 A1 discloses a display device with an image replay facility and an image capturing facility. The image replay facility comprises a display module and the image capturing facility captures an object to be observed and generates corresponding image data. Furthermore, a sensor is provided which acquires a movement of the image capturing facility resulting in a blurred image being captured and generates corresponding movement signals. The image replay facility replays the image by means of the display module on the basis of the image data and of the movement signals in an image-stabilizing manner, such that the user can perceive the image with no blurring. The image replay facility and image capturing facility are here attached to a carrying facility that can be worn on the head of a user. To prevent even desired movements of the head, for example in order to change an image detail being viewed, from being identified as blurring, provision is made for suitable low-pass or band-pass filtering.

It is assumed here that undesired movements always result in higher-frequency output signals from a motion sensor system, but this is not always the case. Additional components are may also be necessary to effect the filtering.

SUMMARY

In one embodiment, an image capturing system is provided for capturing and transmitting digital video images with an image sensor for acquiring digital image data, a position control, which controls a position of the image sensor and/or of the image capturing system based on a mechatronic model, at least one motion sensor for acquiring position changes of the image sensor and/or of the image capturing system and an output interface, via which the acquired image data and associated metadata can be transmitted to an image data processing system, the metadata comprising the following data: up-to-date control data for position control at the time of the image data acquisition, an up-to-date parameter set of the mechatronic model at the time of the image data acquisition and accumulated output data of the at least one motion sensor between the time of the image capture and the time of a previous image capture.

In a further embodiment, the image capturing system has an encoder which links the metadata to the image data in the form of an annotation. In a further embodiment, the image sensor is designed such that the captured image section is larger than an image section provided for replay. In a further embodiment, the image section captured by the image sensor is established as a function of an expected blurring amplitude.

In another embodiment, an image data processing system for receiving and processing digital image data comprises an input interface via which image data and associated metadata can be received from an image capturing system. The metadata comprises the following data: up-to-date control data for position control at the time of the image data acquisition, the position control controlling a position of the image capturing system and/or of an image sensor of the image capturing system based on a mechatronic model, an up-to-date parameter set of the mechatronic model at the time of the image data acquisition, and accumulated output data of at least one motion sensor between the time of the image capture and the time of a previous image capture, the motion sensor acquiring position changes of the image sensor and/or of the image capturing system, the image data processing system further comprising an image data correction unit, which distinguishes undesired position changes from desired position changes of the image sensor and/or of the image capturing system based on the metadata and a receive-side copy of the mechatronic model, and corrects the image data such that undesired position changes of the image sensor and/or of the image capturing system are compensated.

In a further embodiment, the image data correction unit determines a desired position change of the image sensor and/or of the image capturing system based on the up-to-date control data for position control and the up-to-date parameter set of the mechatronic model as well as the receive-side copy of the mechatronic model, and from a comparison with the accumulated output data of the at least one motion sensor determines undesired position changes of the image sensor and/or of the image capturing system. In a further embodiment, the image data is additionally corrected as a function of a movement of distinctive image elements in consecutive individual images of a video stream.

In another embodiment, an image stabilizing system for generating digital video images with little blurring is provided, with an image capturing system and an image data processing system having any of the features disclosed above, with image data and associated metadata being transmitted from the image capturing system to the image data processing system and corrected image data being generated by the image data processing system.

In another embodiment, a method is provided for generating digital video images with little blurring, wherein digital image data is acquired by an image sensor of an image capturing system, the position of the image capturing system and/or of the image sensor being controlled by position control based on a mechatronic model, position changes of the image sensor and/or of the image capturing system are acquired by at least one motion sensor, he acquired image data is transmitted to an image data processing system together with metadata in the form of up-to-date control data for position control at the time of the image data acquisition, of an up-to-date parameter set of the mechatronic model at the time of the image data acquisition and accumulated output data of the at least one motion sensor between the time of the image capture and the time of a previous image capture, and undesired position changes are distinguished from desired position changes of the image sensor and/or of the image capturing system by the image data processing system based the metadata and a receive-side copy of the mechatronic model and the image data is corrected such that undesired position changes of the image sensor and/or of the image capturing system are compensated.

BRIEF DESCRIPTION OF THE DRAWINGS

Example embodiments will be explained in more detail below with reference to figures, in which:

FIG. 1 shows the correction data determination 15 and the image correction 17 as separate units within the image data correction unit 16. These units can however of course also be integrated into a higher-level unit or also divided into further subunits.

DETAILED DESCRIPTION

Some embodiment provide an image stabilizing system with an image capturing system for capturing and transmitting digital video images and an image data processing system for receiving and processing digital image data as well as a method for generating digital video images with little blurring, which may ensure reliable and low-cost electronic image stabilization based on output signals from a motion sensor, even if the image capturing system or an image sensor of the image capturing system also performs desired movements.

Some embodiment provide an image capturing system for capturing and transmitting digital video images with an image sensor for acquiring digital image data, position control which controls a position of the image sensor and/or of the image capturing system based on a mechatronic model, at least one motion sensor for acquiring position changes of the image sensor and/or of the image capturing system, and a data interface via which the acquired image data as well as associated metadata can be transmitted to a data evaluation unit. The metadata here comprises the following data:
up-to-date control data for position control at the time of the image data acquisition
an up-to-date parameter set of the mechatronic model at the time of the image data acquisition and
accumulated output data of the at least one motion sensor between the time of the image capture and the time of a previous image capture.

Some embodiments provide an image data processing system for receiving and processing digital image data with an interface via which image data and associated metadata can be received from an image capturing system, the metadata comprising the following data:
up-to-date control data for position control at the time of the image data acquisition, the position control controlling a position of the image capturing system and/or of an image sensor of the image capturing system based on a mechatronic model,
an up-to-date parameter set of the mechatronic model at the time of the image data acquisition and
accumulated output data at least of one motion sensor between the time of the image capture and the time of a previous image capture, the motion sensor acquiring position changes of the image sensor and/or of the image capturing system.

An image data correction unit may distinguish, based on the metadata and a receive-side copy of the mechatronic model, between undesired position changes and desired position changes of the image sensor and/or of the image capturing system and corrects the image data such that undesired position changes of the image sensor and/or of the image capturing system are compensated.

Some embodiments employ the concept of transmitting not just image data and sensor data from the image capturing system to the image data processing system, but also additional information which relates to the position control used in the image capturing system and which allows the image data processing system to separate undesired movements of the image sensor and/or of the image capturing system from desired movements, in order then to correct the image data such that only undesired movements are compensated. The position control of the image sensor and/or of the image capturing system may be model-based, so that the image data processing system provides a desired movement, in other words the deliberately effected change of position of the image sensor and/or of the image capturing system, that can be precisely reconstructed on the receiver side on the basis of up-to-date control data for position control and of an up-to-date parameter set of the mechatronic model at the time of the image capture as well as of a receiver-side copy of the mechatronic model.

According to one embodiment, the image capturing system has an encoder which links the metadata to the associated image data in the form of an annotation. The transmission of the metadata in the form of an annotation, in other words a comment, to the image data represents a particularly simple type of shared transmission of the data, which on the receiver side permits a simple and unambiguous assignment of the metadata to the image data and calls for no synchronization effort whatsoever.

A further embodiment provides that the image sensor is designed such that the captured image section is larger than an image section provided for the replay. The image section captured by the image sensor may be established as a function of an expected blurring amplitude. Blurring generally results in the captured image section being offset from the desired image section. If in connection with compensating for the blurring the image is so to speak "shifted" in the opposite direction to the offset, the effect would be, if the size of the captured image section and of the image section provided for the replay match, that no image information is present in edge regions of the image. To prevent this effect it may be advantageous to capture a somewhat larger image, so that after "shifting" image information is present for all subregions of the image to be replayed.

According to a further embodiment, the image data is additionally corrected by the image data processing system as a function of a movement of distinctive image elements in consecutive individual images of a video stream. For example, because of mechanical natural oscillations of a support structure to which the image capturing system is attached, the output signals from the motion sensors also contain a percentage of noise. This percentage of noise leads for example to integration errors when the output data from acceleration sensors is integrated, and these have a negative impact on the compensation for blurring. Such integration errors can for example be corrected or eliminated by evaluating the position change of distinctive image elements or image objects in consecutive individual images. Such algorithms for image stabilization are known in principle and hence are not further expanded on at this point.

Other embodiments provide an image stabilizing system for generating digital video images with little blurring, which includes an image capturing system and an image data processing system as disclosed herein, wherein image data and associated metadata are transferred from the image capturing system to the image data processing system and corrected image data is generated by the image data processing system.

Still other embodiments provide a method for generating digital video images with little blurring in which digital image data is acquired by an image sensor of an image capturing system, the position of the image capturing system and/or of the image sensor being controlled by position control based on a mechatronic model. Position changes of the image sensor and/or of the image capturing system are acquired by at least one motion sensor. The acquired image data is transmitted to an image processing system together with metadata in the form of up-to-date control data for position control at the time of the image data acquisition, an up-to-date parameter set of the mechatronic model at the time of the image data acquisition, and accumulated output data of the at lease one motion sensor between the time of the image capture and the time of a previous image capture. Undesired position changes are distinguished from desired position changes of the image sensor and/or of the image capturing system by the image data processing system based on the metadata and a receive-side copy of the mechatronic model, and the image data is corrected such that undesired position changes of the image sensor and/or of the image capturing system are compensated.

Further features and advantages emerge from exemplary embodiments which are explained below on the basis of the drawing, which shows a schematic block diagram of an example image stabilizing system.

An image stabilizing system 1 according to one embodiment has an image capturing system 2 for capturing digital video images and an image data processing system 3 for processing the video images captured by the image capturing system. The image capturing system 2 comprises at least one digital image sensor 4. The position of the image sensor 4 or also of the whole image capturing system 2 is controlled with the aid of position control (not shown). The position control is here executed as a mechatronic system, different actuators being controlled with the aid of control logics such that the image sensor 4 or the image capturing system 2 assume a desired target position. The respective actual position for the position control is here acquired on the basis of output signals or output data at least from one motion sensor 5. The motion sensor 5 can here for example be implemented as an acceleration sensor, speed sensor or else as a gyrometer. The position control is model-based on the basis of a mechatronic model 6.

The image capturing system 2 also comprises an encoder 7, which links image data acquired by the image sensor 4 to metadata and converts it into a predefined transmission format for a video stream 8 to be transmitted. The metadata here comprises firstly up-to-date control data for position control at the time of the image data acquisition and an up-to-date parameter set of the mechatronic model at the time of the image data acquisition (summarized in a data arrow 9) and secondly accumulated output data 10 of the motion sensor 5 between the time of the image capture and the time of a previous image capture. This metadata may be linked to the associated image data in the form of an annotation and is thus so to speak embedded into the image data.

The image data is then transmitted together with the metadata via an output interface 11 in the form of the video stream 8 to the image data processing system 3. This transmission can be wired or wireless. To receive the video stream and thus the image data and metadata the image data processing system 3 has an input interface 12. If the image capturing system 2 is for example disposed on board an aircraft, in order to capture images of an object to be monitored, the image data processing system 3 can likewise be disposed on board the aircraft. Alternatively, the image data processing system 3 can however also be disposed outside the aircraft, e.g. in a ground station or in a laboratory. In this way no additional components are necessary on board the aircraft besides the image capturing system, resulting in a simple construction and reduced space requirement on board the aircraft.

A decoder 13 is provided in the image data processing system 3, and converts the data of the video stream 8 into a data format that can be processed by the image data processing system 3 and thereby separates the image data from the metadata. The metadata 14 is then further processed in a correction data determination 15. Based on the up-to-date control data for position control at the time of the image data acquisition and the up-to-date parameter set of the mechatronic model 6 at the time of the image data acquisition a desired target position or target movement of the image sensor 4 or of the image capturing system 2 can be determined with the aid of a copy of the mechatronic model in the correction data determination 15. Based on the accumulated output data of the motion sensor between the time of the image capture and the time of a previous image capture, an up-to-date actual position of the image sensor 4 or of the image capturing system 2 at the time of the image capture or also the actual movement made by the image sensor 4 or by the image capturing system 2 since the previous image capture can secondly be determined in the correction data determination 15. By comparing the actual data with the target data, undesired position changes of the image sensor 4 or of the image capturing system 2 can be distinguished and separated from desired position changes caused by corresponding control of the actuators for position control.

Due to the correction data determination 15, image correction data 16 is then generated, and corrects the image data received via the video stream 8 such that undesired position changes of the image sensor 4 and/or of the image capturing system 4 are compensated. In this case an offset of the image section caused by blurring, in other words the undesired position change, is in particular equalized by correspondingly shifting the image in the opposite direction. To avoid a situation in which no image data is present here for edge regions of the shifted image, it may be advantageous for the image section captured by the image sensor 4 to be larger than an image section provided for replay, the captured image section being established as a function of an expected blurring amplitude.

Corrected image data 18 is then generated in an image correction 17 on the basis of the image data and of the image correction data 16.

The correction determination 15 and the image correction 11 together form an image data correction unit 19.

The corrected image data generated by the image data correction unit 19 can be converted by a further encoder 20 provided in the image data processing system 3 into a data format suitable for further transmission, so that ultimately a corrected video stream 21 can be output by the image data processing system 3.

FIG. 1 shows the correction data determination 15 and the image correction 17 as separate units within the image data correction unit 16, according to an example embodiment. These units can however of course also be integrated into a higher-level unit or also divided into further subunits.

It is also possible that part of the image stabilization is already effected by the image capturing system 2, e.g. in the form of optical image stabilization.

What is claimed is:

1. An image capturing system for capturing and transmitting digital video images, comprising:
   an image sensor for acquiring digital image data at a particular time,
   a position control configured to control a position of at least one of the image sensor and the image capturing system based on a mechatronic model,
   at least one motion sensor configured to acquire position changes of the at least one of the image sensor and the image capturing system, and
   an output interface via which the acquired image data and associated metadata is transmitted to an image data processing system, the metadata comprising the following data:
      up-to-date control data for position control at the particular time of the image data acquisition,
      an up-to-date parameter set of the mechatronic model at the particular time of the image data acquisition, and
      accumulated output data of the at least one motion sensor between the particular time of the image data acquisition and a time of a previous image data acquisition.

2. The image capturing system of claim 1, further comprising an encoder that links the metadata to the image data in the form of an annotation.

3. The image capturing system of claim 1, wherein the image sensor is configured to capture an image section that is larger than an image section provided for replay.

4. The image capturing system of claim 3, wherein the image section captured by the image sensor is established as a function of an expected blurring amplitude.

5. An image data processing system for receiving and processing digital image data, comprising:
   an input interface via which image data captured at a particular time, and associated metadata, is received from an image capturing system, the metadata comprising the following data:
      up-to-date control data for position control at the particular time of the image data acquisition, the position control controlling a position of at least one of the image capturing system and an image sensor of the image capturing system based on a mechatronic model,
      an up-to-date parameter set of the mechatronic model at the particular time of the image data acquisition, and
      accumulated output data of at least one motion sensor between the particular time of the image capture and a time of a previous image capture, the motion sensor acquiring position changes of at least one of the image sensor and of the image capturing system, and
   an image data correction unit configured to:
      distinguish undesired position changes from desired position changes of at least one of the image sensor and the image capturing system based on the metadata and a receive-side copy of the mechatronic model, and
      correct the image data such that undesired position changes of the at least one of the image sensor and the image capturing system are compensated.

6. The image data processing system of 5, wherein the image data correction unit is configured to:
   determine a desired position change of the at least one of the image sensor and the image capturing system based on the up-to-date control data for position control and the up-to-date parameter set of the mechatronic model as well as the receive-side copy of the mechatronic model, and
   determine undesired position changes of the at least one of the image sensor and of the image capturing system based on a comparison with the accumulated output data of the at least one motion sensor.

7. The image data processing system of claim 5, wherein the image data is additionally corrected as a function of a movement of distinctive image elements in consecutive individual images of a video stream.

8. A method for generating digital video images with little blurring, comprising:
   acquiring digital image data by an image sensor of an image capturing system at a particular time, wherein the position of at least one of the image capturing system and the image sensor is controlled based on a mechatronic model,
   acquiring position changes of the at least one of the image sensor and the image capturing system using at least one motion sensor,
   transmitting the acquired image data to an image data processing system together with metadata including (a) up-to-date control data for position control at the particular time of the image data acquisition, (b) an up-to-date parameter set of the mechatronic model at the particular time of the image data acquisition, and (c) accumulated output data of the at least one motion sensor between the particular time of the image capture and a time of a previous image capture,
   automatically distinguishing undesired position changes from desired position changes of the at least one of the image sensor and the image capturing system using the image data processing system based on the metadata and a receive-side copy of the mechatronic model, and
   automatically correcting the image data such that undesired position changes of the at least one of the image sensor and the image capturing system are compensated.

9. The method of claim 8, further comprising linking the metadata to the image data in the form of an annotation.

10. The method of claim 8, wherein acquiring the digital image data comprises using the image sensor to capture an image section that is larger than an image section provided for replay.

11. The method of claim 10, comprising establishing the image section captured by the image sensor as a function of an expected blurring amplitude.

* * * * *